(No Model.) 4 Sheets—Sheet 1.
J. DAVIS.
FILTER.
No. 558,485. Patented Apr. 21, 1896.
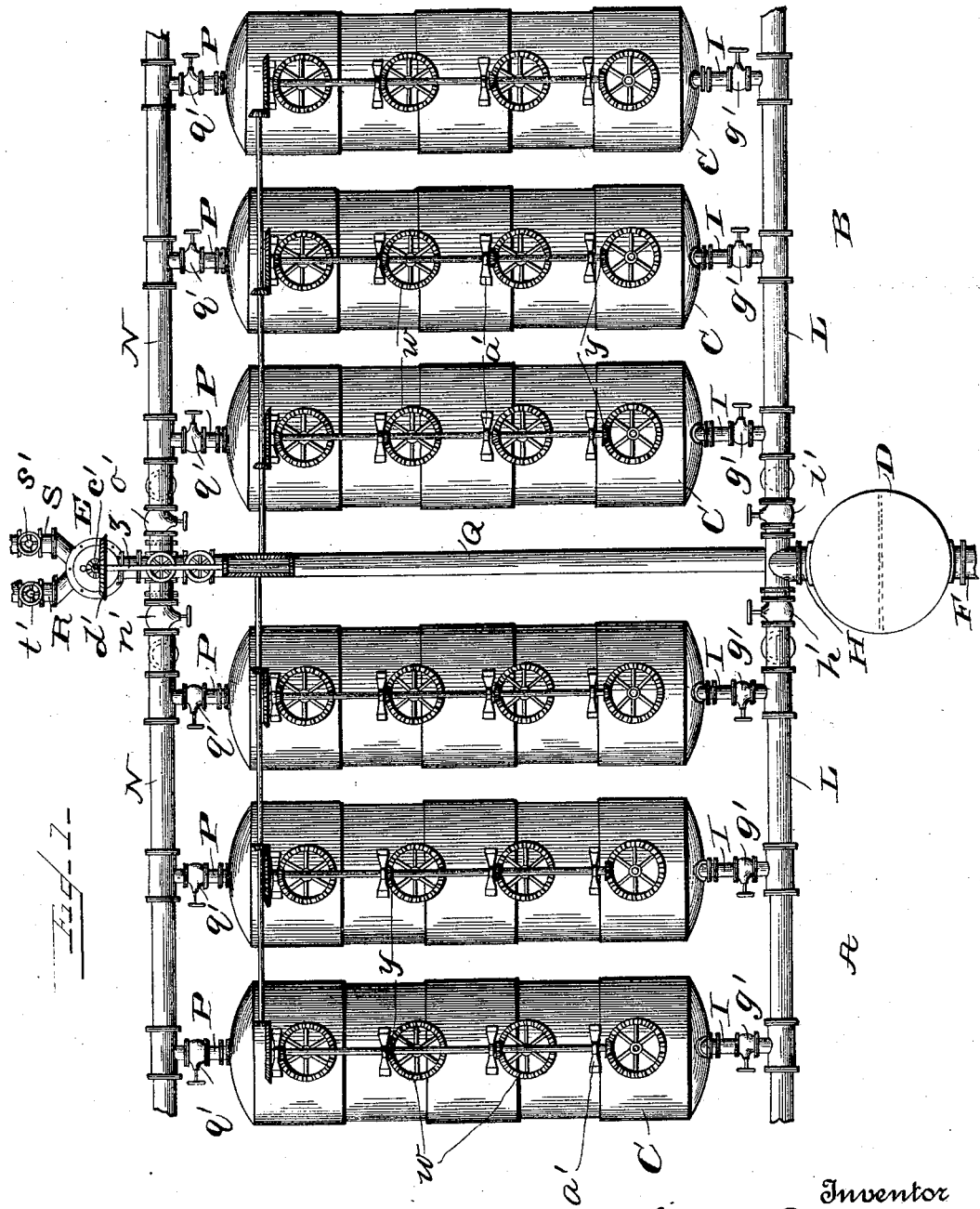
Witnesses
Inventor
John Davis
By D. C. Reinohl.
Attorney (No Model.) 4 Sheets—Sheet 2.
J. DAVIS.
FILTER.
No. 558,485. Patented Apr. 21, 1896.
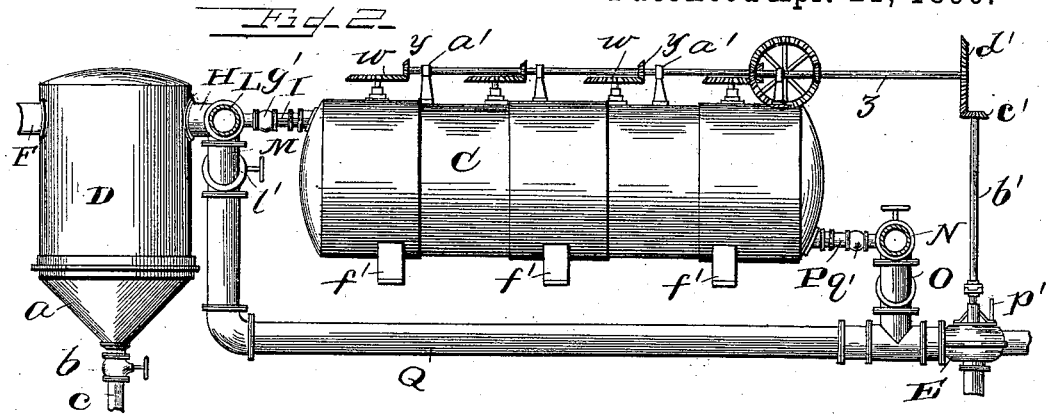
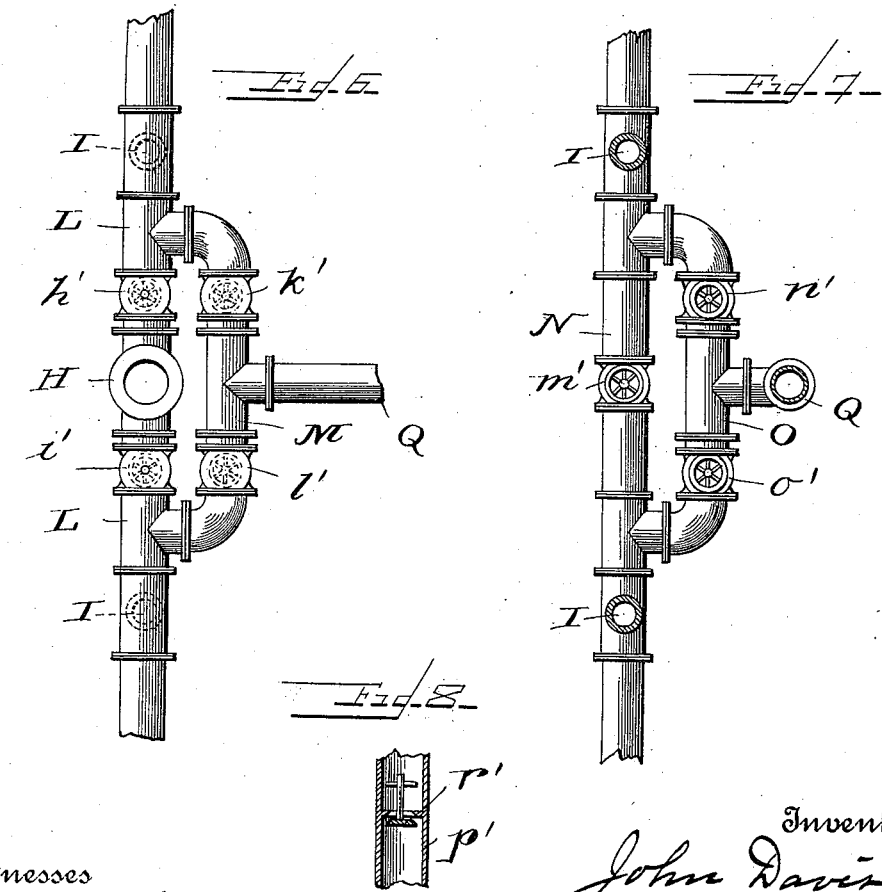
Witnesses
G. A. Tauberschmitt.
D. L. Weimer Reinohl.
Inventor
John Davis
By D. L. Reinohl
Attorney (No Model.) 4 Sheets—Sheet 3.

J. DAVIS.
FILTER.

No. 558,485. Patented Apr. 21, 1896.

Witnesses
G. A. Tauberschmidt
D. Werner Reinohl

Inventor
John Davis
By D. L. Reinohl
Attorney (No Model.) 4 Sheets—Sheet 4.

J. DAVIS.
FILTER.

No. 558,485. Patented Apr. 21, 1896.

Witnesses
G. A. Taubenschmidt
D. Weimer Reinohl

Inventor
John Davis
By D. C. Reinohl
Attorney

UNITED STATES PATENT OFFICE.

JOHN DAVIS, OF ALLEGHENY, PENNSYLVANIA.

FILTER.

SPECIFICATION forming part of Letters Patent No. 558,485, dated April 21, 1896.

Application filed November 15, 1894. Serial No. 528,890. (No model.)

*To all whom it may concern:*

Be it known that I, JOHN DAVIS, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has for its object certain improvements which will be fully disclosed in the following specification and claims.

Figure 3:
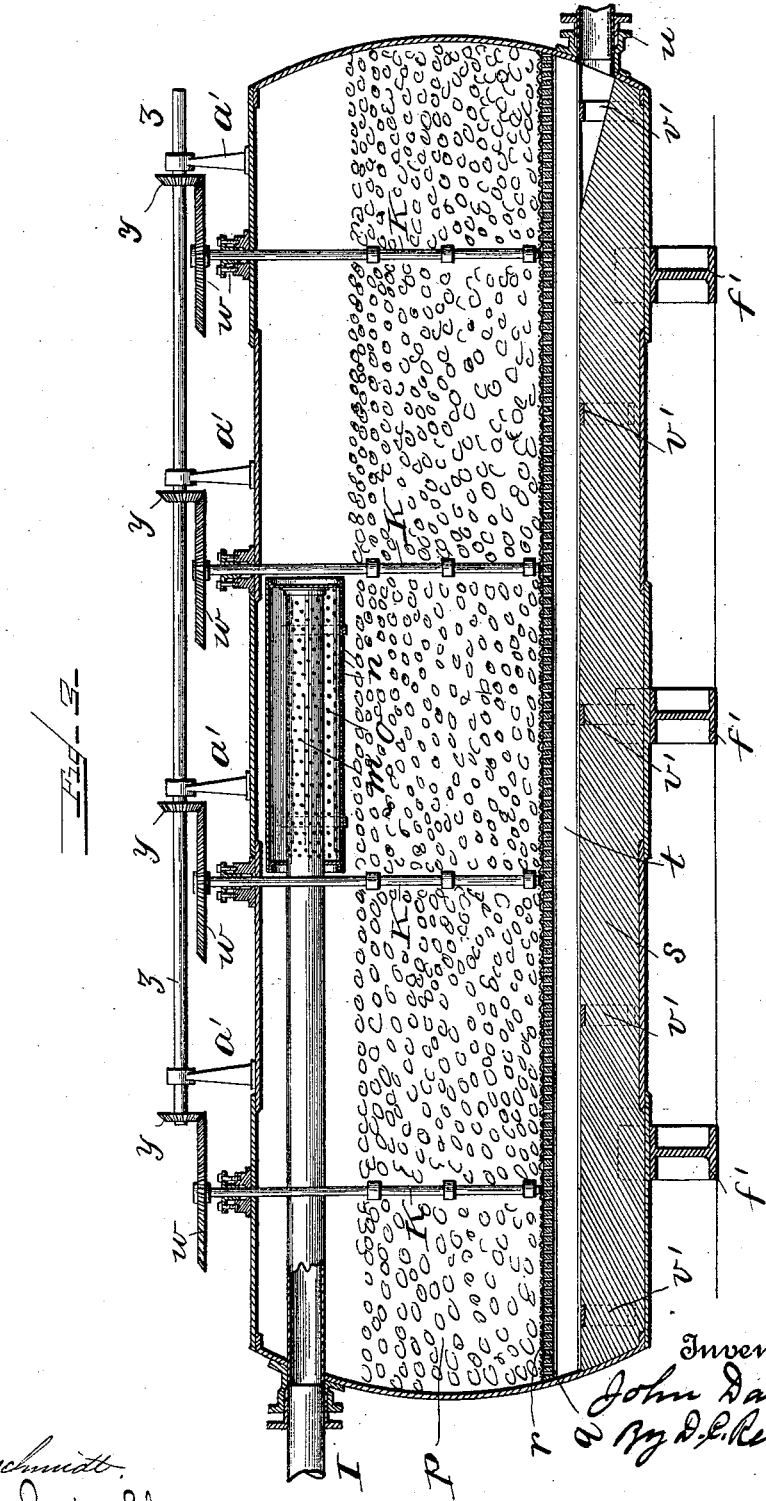
Figure 4:
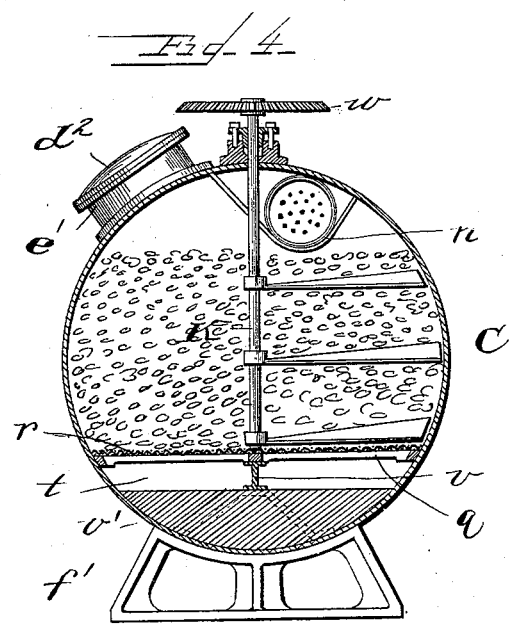
Figure 5:
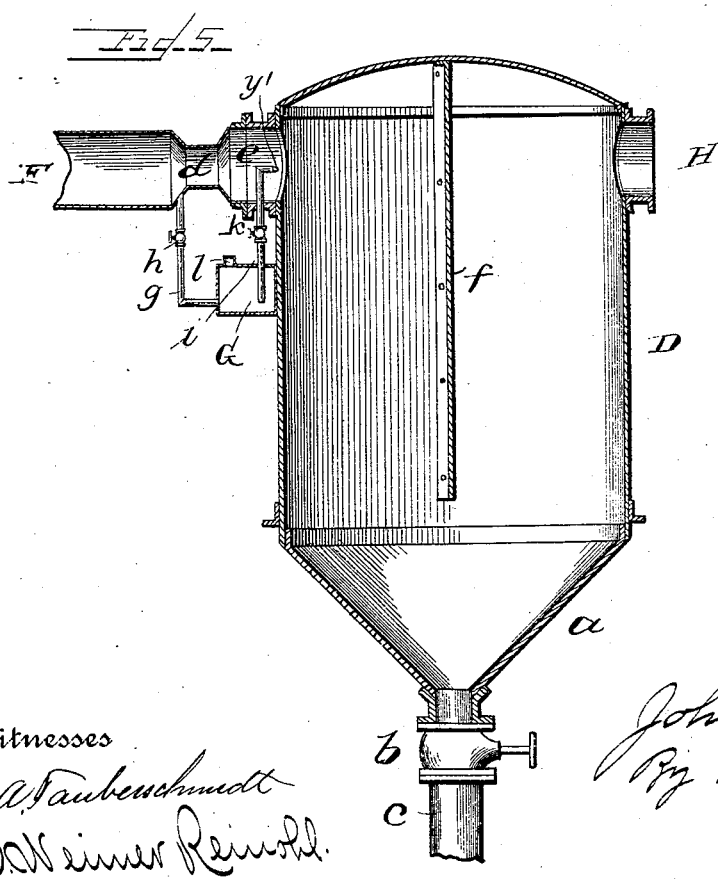

In the accompanying drawings, which form part of this specification, Figure 1 represents a top plan view of a filter plant; Fig. 2, an end elevation of the plant; Fig. 3, a vertical longitudinal section of one of the filters on an enlarged scale; Fig. 4, a transverse section; Fig. 5, a vertical section of the precipitating or settling chamber; Fig. 6, an elevation of the front by-pass; Fig. 7, a like view of the rear by-pass, and Fig. 8 a detail showing the check-valve in the air-supply pipe of the water-motor and aerator.

Reference being had to the drawings and the letters thereon, A indicates a battery of filters and B a duplicate battery, C the filters, D the precipitator or settling-chamber, and E the motor and aerator to supply air to the filtered water and operate the lifters and scourers of the granular filter-beds, the whole constituting the principal elements of a plant to supply a city or town with filtered water.

The number of the filters may be varied to suit the requirements of the plant.

The precipitator D is in the form of a vertical cylindrical vessel having a conical lower end $a$ to collect the impurities of the water coagulated and precipitated into said chamber and discharged through a valve $b$ and pipe $c$.

F is the supply-conduit which enters the precipitator near its upper end and is provided with a contracted throat $d$ and an enlarged mouth or discharge end $e$. The precipitator is provided with a partition $f$, which extends down near the lower end of the cylindrical portion of the precipitator. From the conduit F on the outside of the throat $d$ a pipe $g$, provided with a valve $h$, extends to and communicates with a chemical chamber G, preferably attached to the outside of the precipitator and which may contain alum or any suitable coagulating or precipitating elements, and on the opposite or inner side of the throat is a pipe $i$, having a valve $k$ and a branch $y'$, which extends up from the chemical chamber to the center of the discharge end of the conduit. The branch $y'$ faces toward the center of the precipitator and discharges the chemical solution in the direction of the current of the inflowing water. The throat $d$ arrests the water in its flow and creates pressure to the water supplied to the chemical chamber G through the pipe $g$ to agitate and dissolve the coagulant or other chemical elements, and the chemical solution is forced through pipe $i$ in quantity regulated by valve $k$ and is discharged into the precipitator through the enlarged end $e$ of the conduit F. The chemical solution mingling with the water as it is discharged into the precipitator coagulates the impurities, and they by this means become heavier than the water bulk for bulk and leave the water in its passage through the precipitator at the lower end of the partition $f$ and gravitate into the contracted lower end of the vessel from which they are discharged at intervals through the valve $b$, while the water, relieved of the major portion of its silt, sediment, and other impurities, ascends on the opposite side of the diaphragm $f$ and is discharged through pipe H and conducted to the filters for further purifying.

The diaphragm $f$, besides giving a downward direction to the water and its impurities, separates the incoming water with all its impurities from the water partly freed of its impurities by coagulation and precipitation and being supplied to the filters through pipe H.

Chemicals are supplied to chamber G through nipple $l$, which is provided with a cap or cover.

Each filter C is provided with a branch supply-pipe I, which enters the filter near its upper part and extends beyond its longitudinal median line and terminates in a perforated end $m$, which is surrounded by a foraminous jacket $n$, forming a concentric or annular chamber $o$ to receive pebbles which strain the water in its passage into the filters and especially prevents the granular filtering medium from wasting when the current of water is reversed in cleaning the filters.

The filter-bed rests upon a grating $q$ with two or more layers of wire-gauze $r$ covering the upper surface of the grating, and a few inches below the grating is a bottom $s$, formed of cement or other material impervious to water which forms a pure-water space $t$ between the grating and the bottom, from which chamber water is discharged through pipe P. The filters C are provided with agitators K, the shafts of which rest upon the grating $q$, which is supported on a bar $v$ of angle-iron resting upon brackets $v'$ in the cement bottom, and the shafts are provided at their upper ends with gear-wheels $w$, which are engaged by pinions $y$ on the shaft $z$, which is supported in brackets $a'$, and connected to a suitable turbine water-motor E by shaft $b'$ and gear-wheels $c'$ $d'$ to revolve the agitators and scourers and aid in raising the granular filter-bed for the purpose of cleansing it. Each filter is provided with a manhole $e'$ and a cover $d^2$ to afford ready access to the filter-chamber, and the filters are supported upon suitable cast-iron cradles $f'$.

For the purpose of describing the filter plant I designate the end of the filters at which the precipitator D is located as the front, and the opposite end the rear of the plant.

The filters C are connected at the front end by a supply-main L, from which the branches I, having valves $g'$, extend to the several filters, and in the center of the main L is a by-pass M. The main L is provided with valves $h'$ $i'$, and the by-pass M is provided with valves $k'$ $l'$, and at the rear end the filters are connected by a discharge-main N, in the center of which is a by-pass O. The main N is provided with valve $m'$ and the by-pass O with valves $n'$ $o'$, and from the main N extend branch discharge-pipes P, having valves $q'$, to the several filters, and through which branches and main the filtered water is conducted.

The front and rear by-passes are connected by a pipe Q, and the motor and aerator E is connected to the outer end of said pipe Q and supplied with water therefrom. The water passing through the motor is supplied with air through pipe $p'$ and air flows with the water into the city or town service-main R. The pipe $p'$ is provided with an inwardly-opening check-valve $r'$ to prevent leakage of water when the motor is not in operation and to supply air to the water when the motor is in operation, as shown in Fig. 8. The gravity of the valve causes it to open and remain so until the water is turned on the motor, when the pressure of the water forces the valve to its seat.

The valve $g'$ at the front of the filters and the valves $q'$ at the rear of the filters are continuously open in the general operation of the plant, and will not be referred to in describing the operation of the plant in filtering water or cleansing the filters. Their functions are special—namely, to exclude the water from individual filters of the plant when desired.

In operating the entire plant for filtering, the valves $h'$, $i'$, $o'$, $n'$, and $s'$ are open and valves $k'$, $l'$, and $m'$ are closed. The valves $h$ and $k$ of the chemical-chamber G are partially or wholly open continuously while filtering. The water is supplied to the precipitator through the conduit F and to the filters through the main L on either side of the precipitator. Leaving the filters the water passes through pipes N and O into the pipe Q and then into the motor and aerator E and then into the service-pipe R. In filtering with battery A the valves $h'$, $n'$, and $s'$ are open and valves $k'$, $l'$, $m'$, $o'$, and $t'$ are closed.

In filtering with battery B the valves $i$, $o'$, and $t'$ are open and valves $k'$, $l'$, $h'$, $m'$, $n'$, and $s'$ are closed. In cleansing the granular filter-beds of battery A with water that is being filtered by battery B the valves $i$, $n'$, $k'$, and $t'$ are open and the valves $h'$, $l'$, $o'$, $n'$, and $s'$ are closed. In cleansing the filter-beds of battery B with water that is being filtered by battery A the valves $h'$, $n'$, $l'$, and $t'$ are open and the valves $i$, $k'$, $o'$, $n'$, and $s'$ are closed. By thus operating the batteries of filters filtered water from one battery is used to cleanse the beds of the other battery, thereby leaving no impurities in the lower parts of the beds and impure water in the chambers beneath them, as is the case when unfiltered water is used for cleansing the beds, (which impure water must first be removed,) but supplying filtered water to the mains as soon as the filter-beds have been cleansed.

In the operation of cleansing the beds of one battery of filters the water is taken from the discharge end of the working battery and conducted through the main N, branches P, and valves $q'$ into the filters of the other battery below the filter-beds and up through the beds while the beds are raised and agitated by the agitators K, thence through pipe I into pipe L, which conducts it into pipe Q and through the motor, and is discharged from the pipe S into a sewer or other receptacle.

Having thus fully described my invention, what I claim is—

1. A filter plant comprising a precipitator provided with means for coagulating and arresting impurities of the water to be filtered, a plurality of batteries of filters connected to said precipitator at one end and near the tops of the filters, discharge-pipes at the opposite ends and near the bottom of the filters, a supply-main and a discharge-main connected to said batteries and each provided with a by-pass pipe, and a combined motor and aerator operated by the filtered water and discharging air into the water in transit to the service main or reservoir.

2. A filter plant comprising a precipitator provided with means for coagulating and arresting impurities of the water to be filtered, a plurality of batteries of filters connected to said precipitator at one end and near the tops of the filters, discharge-pipes at the opposite ends and near the bottom of the filters a by-pass in the supply-main and in the discharge-main, a pipe connecting the by-passes in said supply and the discharge mains and a combined motor and aerator connected to the discharge-main.

3. A filter plant comprising a plurality of batteries of filters, a supply-main and a discharge-main connecting the batteries and the filters composing each battery, means in each main for cutting off communication with the batteries through the main, a by-pass pipe provided with suitable valves in the mains between the batteries and a pipe connecting said by-pass pipes.

In testimony whereof I affix my signature in presence of two witnesses.

JOHN DAVIS.

Witnesses:
 JOHN K. EWING,
 F. S. CARMACK.